US010068072B1

(12) United States Patent
Jeffree et al.

(10) Patent No.: US 10,068,072 B1
(45) Date of Patent: Sep. 4, 2018

(54) IDENTITY VERIFICATION

(76) Inventors: Anthony Alan Jeffree, Sale (GB);
Gary Vacon, East Falmouth, MA (US);
Floyd Backes, Sharon, NH (US);
Laura Bridge, Sharon, NH (US);
Roger Pfister, Wokingham (GB)

(*) Notice: Subject to any disclaimer, the term of this patent is extended or adjusted under 35 U.S.C. 154(b) by 541 days.

(21) Appl. No.: 12/778,430

(22) Filed: May 12, 2010

Related U.S. Application Data

(60) Provisional application No. 61/177,403, filed on May 12, 2009.

(51) Int. Cl.
*G06F 21/30* (2013.01)
*H04L 9/32* (2006.01)

(52) U.S. Cl.
CPC ............ *G06F 21/30* (2013.01); *H04L 9/32* (2013.01)

(58) Field of Classification Search
CPC .......... G06F 21/32; G06F 67/24; G06F 3/167; H04W 12/06
USPC .......... 726/7, 27; 705/18, 35, 39, 44, 53, 64, 705/72, 75, 76; 713/176, 186, 193; 340/5.83, 5.82, 5.86; 235/382; 382/115, 382/119, 124, 232
See application file for complete search history.

(56) References Cited

U.S. PATENT DOCUMENTS

| | | | | |
|---|---|---|---|---|
| 5,828,730 A * | 10/1998 | Zebryk | ................ | G11B 19/02 369/25.01 |
| 5,897,616 A * | 4/1999 | Kanevsky | ................ | G10L 17/24 379/88.02 |
| 6,219,639 B1 * | 4/2001 | Bakis | ................ | G06K 9/00885 382/116 |
| 6,607,136 B1 * | 8/2003 | Atsmon | ................ | G06F 21/34 235/487 |
| 6,618,806 B1 * | 9/2003 | Brown et al. | ................ | 713/186 |
| 7,254,708 B2 * | 8/2007 | Silvester | ................ | H04L 63/08 713/168 |
| 7,882,363 B2 * | 2/2011 | Duffy et al. | ................ | 713/186 |
| 8,006,291 B2 * | 8/2011 | Headley et al. | ................ | 726/7 |
| 8,312,660 B1 * | 11/2012 | Fujisaki | ................ | F41A 17/08 42/70.01 |
| 8,676,273 B1 * | 3/2014 | Fujisaki | ................ | H04M 1/6505 379/142.06 |

(Continued)

*Primary Examiner* — Morshed Mehedi
*Assistant Examiner* — Abdullah Almamun
(74) *Attorney, Agent, or Firm* — Anderson Gorecki LLP

(57) ABSTRACT

An identity verification system enables the identity of an individual to be verified to others using the internet. An initial identification ceremony is recorded in which the user performs instructions that cannot be known in advance, such as reading text that cannot be anticipated. The initial ceremony can be replayed and authenticated by individuals who already personally know the user. Alternatively, the identity of the user in the initial ceremony can be authenticated using other existing techniques such as KBA. A secondary instruction ceremony is subsequently performed when identity verification is required in order to authorize a directive or transaction. In the secondary instruction ceremony the user performs unforeseeable instructions such as reading text that cannot be anticipated and reading aloud an indication of the transaction. The combination of (a) a visual check that the two samples were recorded by the same person and (b) in the second sample the user performs the requested instruction text gives a high degree of confidence that the person authorized the indicated directive or transaction.

16 Claims, 3 Drawing Sheets

(56) References Cited

U.S. PATENT DOCUMENTS

| | | | |
|---|---|---|---|
| 9,189,788 B1* | 11/2015 | Robinson | G06Q 20/40145 |
| 9,743,158 B2* | 8/2017 | Hasek | H04N 21/814 |
| 2002/0188725 A1* | 12/2002 | Mani | G06F 21/31 |
| | | | 709/227 |
| 2003/0053662 A1* | 3/2003 | Evoy | G06K 9/00221 |
| | | | 382/115 |
| 2005/0171851 A1* | 8/2005 | Applebaum | G06F 21/32 |
| | | | 705/18 |
| 2007/0124507 A1* | 5/2007 | Gurram | G06F 3/0481 |
| | | | 710/1 |
| 2007/0143624 A1* | 6/2007 | Steeves | G06F 21/36 |
| | | | 713/182 |
| 2008/0126097 A1* | 5/2008 | Sarid | H04L 29/12594 |
| | | | 704/270.1 |
| 2009/0089869 A1* | 4/2009 | Varghese | 726/7 |
| 2009/0094690 A1* | 4/2009 | Hayashi | 726/7 |
| 2009/0164640 A1* | 6/2009 | Schultz | G06Q 10/00 |
| | | | 709/227 |
| 2009/0171850 A1* | 7/2009 | Yuval | 705/71 |
| 2009/0241175 A1* | 9/2009 | Trandal et al. | 726/7 |
| 2010/0011428 A1* | 1/2010 | Atwood et al. | 726/7 |
| 2010/0095354 A1* | 4/2010 | Uchida et al. | 726/4 |
| 2010/0179856 A1* | 7/2010 | Paretti | G06Q 30/02 |
| | | | 705/14.1 |
| 2011/0072500 A1* | 3/2011 | Varghese | 726/7 |
| 2013/0051759 A1* | 2/2013 | Scheessele | H04L 67/06 |
| | | | 386/241 |

\* cited by examiner

IDENTITY VERIFICATION

CROSS-REFERENCE TO RELATED APPLICATIONS

Priority is claimed to U.S. Provisional Patent Application 61/177,403 entitled Identity Verification, filed May 12, 2009, which is incorporated by reference.

BACKGROUND OF THE INVENTION

The Internet is widely used for commerce, social networking and other functions. However, some of the features that make the Internet useful for those functions also create vulnerability to misuse such as fraudulent purchases, unauthorized asset transfers and other antisocial and illegal acts based on identity theft.

Authentication is used to reduce vulnerability to misuse. One type of authentication is knowledge-based authentication (KBA). According to KBA, a person's identity is validated based on their ability to provide information about themselves. This information can be of the form of pre-shared secrets, e.g., answers to selected questions that the user has previously provided such as mother's maiden name, first pet's name, grade-school attended, etc. Another form of KBA is based on the person's ability to provide information about themselves that is gathered from various sources, e.g. motor vehicle records, real estate records and other public data. Another type of authentication is biometric authentication. Biometric authentication is based on a person's intrinsic physiological or behavioral traits, such as fingerprints, hand geometry, retinal pattern, etc.

One example of KBA in internet commerce is the use of a credit card to provide some level of assurance to vendors that the virtual identity of a customer matches the real identity of that customer. However, the assurance is limited to the ability to write a matching signature or remember a PIN code, which is weak because credit cards and PINs can be lost or stolen. Further, since credit card companies limit the liability to vendors and customers resulting from fraud, it is sufficient for the purposes of online purchases but not much else. Another example of KBA on the Internet is the login. Typically, a username and password are selected by or assigned to the user. However, malfeasants have been known to establish bogus accounts. Further, even genuine accounts are vulnerable because usernames and passwords can be stolen or cracked with programs designed for that purpose. It is also known to perform KBA by having a user contact an agent at a call center. The call center agent has access to a database of personal information about the user which is used as the basis for questions which are posed to the user. This technique is less vulnerable than others, but still has some drawbacks. For example, the personal information is typically obtained from public records which could also be obtained by a determined malfeasant. Further, the agent may reach a false conclusion because the information in public records is sometimes inaccurate. The technique is also relatively slow and labor intensive.

SUMMARY

In accordance with an embodiment of the invention an identity verification system enables the identity of an individual to be verified to others using a network such as the Internet. An identification ceremony is recorded in which the user performs an instructed action which includes a portion that cannot be anticipated or known of in advance, thereby producing an identity record. This identity record may subsequently be played back through the system and provided that the subject in the recording performs the instructed action, the identity record can be considered valid. Identity verification has utility for various applications. For example, and without limitation, a valid identity record that is associated with an account establishes the identity of the account holder. Consequently, the invention may be utilized to verify that a transaction associated with an account is authorized by the account holder.

The identity of the subject in a valid identity record may be authenticated by another person who personally knows the subject or by other existing methods such as KBA, thereby authenticating the identity record. An authenticated identity record that is associated with an account links the account to the account holder's real-world identity.

A secondary identification ceremony may subsequently be performed when the account holder wishes to authorize an account transaction. In the secondary identification ceremony the user performs an instructed action which includes a portion that cannot be anticipated or known of in advance and a portion that identifies the desired transaction, thereby producing a transaction identity record. The transaction identity record may be played back through the system and compared with the account identity record and provided that the two records were recorded by the same person and that the transaction identity record correctly reflects the requested instruction, the transaction identity record can be considered valid. A valid transaction record assures that the established account holder made the transaction request. In the case that the account identity record is authenticated, a valid transaction identity record can also be assured to have been made by the identified individual.

One advantage of the invention is that, unlike KBA, its continued use does not contribute to the exposure of personal information about the person being authenticated. Another advantage of the invention is that, unlike many biometric techniques, it is non-invasive and doesn't necessarily involve close physical contact with measuring devices. Other advantages will become apparent in view of the detailed description of embodiments of the invention.

DETAILED DESCRIPTION

Figure 1:
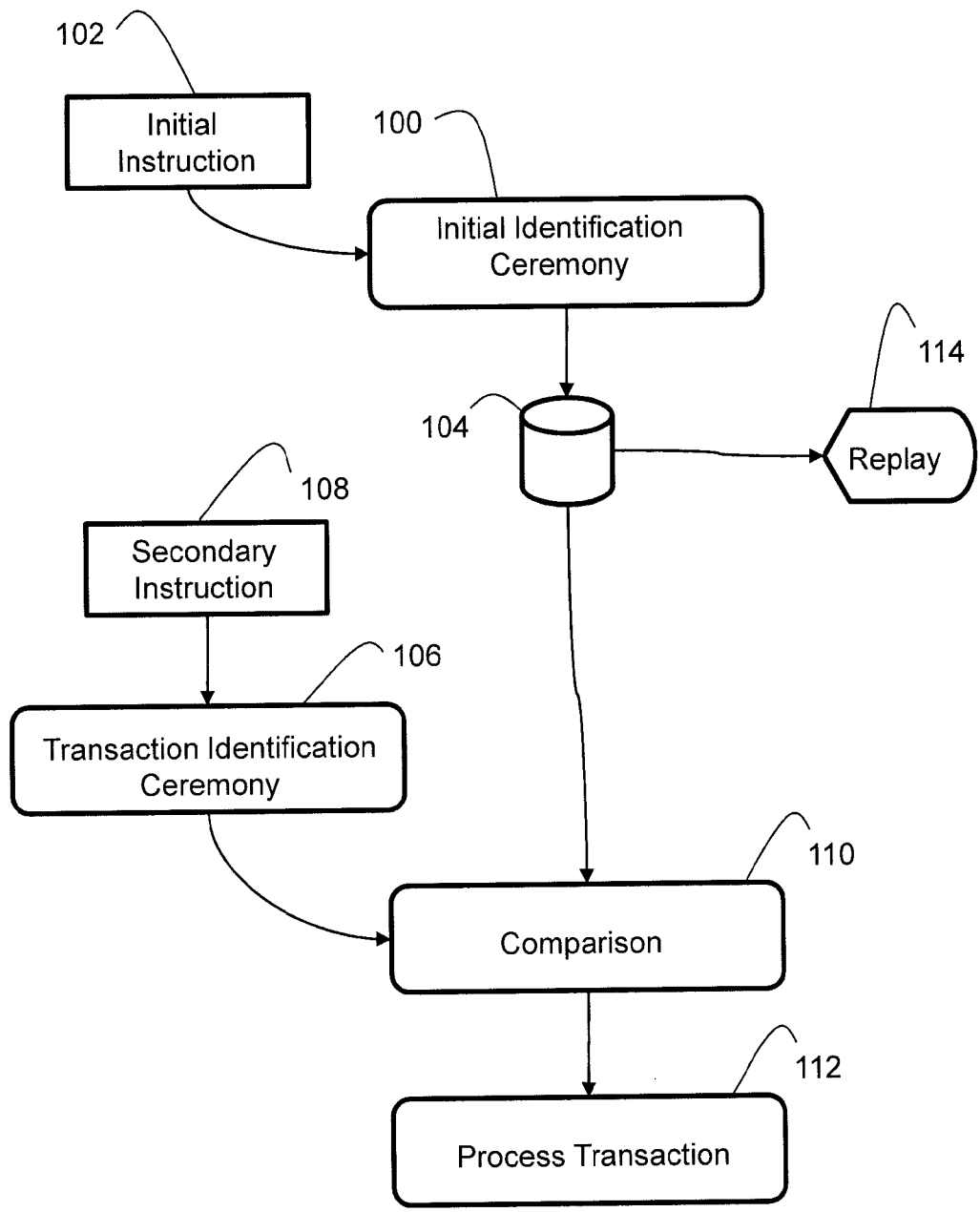
FIG. 1 is a flow diagram of a method of identity verification.
Figure 2:
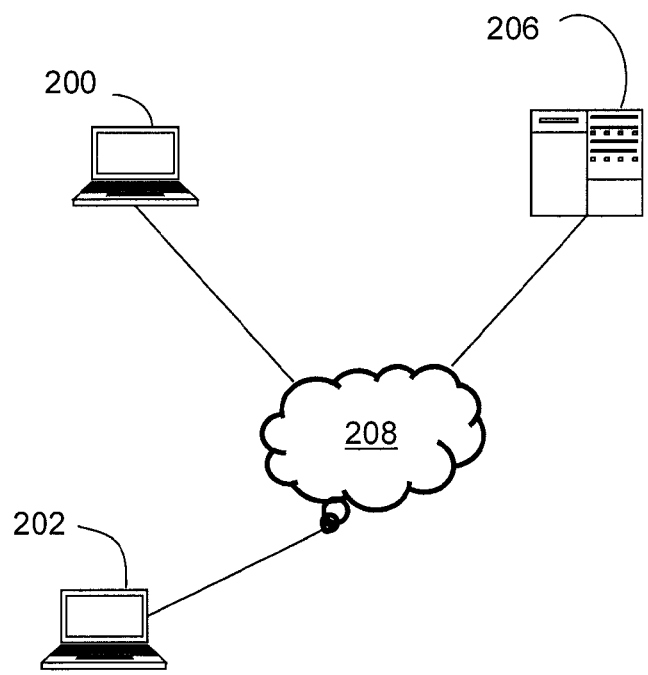
FIG. 2 is a block diagram illustrating apparatus for performing the method of FIG. 1.

Referring to FIGS. 1 and 2, an embodiment of the invention can be implemented with computers 200, 202 and a server 206 interconnected via a network 208 such as the Internet. The computers could be laptop, notebook, or desktop PCs, PDAs, mobile phones, networked televisions or any other device with capabilities suitable for performing functions described below. Computer 200 is used by a person who wishes their identity to be verifiable. Computer 202 is used by a person performing the identity verification, e.g., a call center agent. Aspects of the invention may be implemented with computer software program code stored on a computer readable medium associated with one or more of the computers and servers, or by data storage centers or other resources. When operated, the program code implements some or all of the steps that will be described below.

At some time prior to the time at which identity verification is performed the person who wishes their identity to be verifiable participates in an initial identification ceremony at computer 200 as indicated by step 100. In response to a request by the person wishing to be verifiable, the server presents the user with an instructed action such as instruction text ("initial instruction") that cannot be anticipated or known of in advance in step 102. For example, initial instruction text could include reading a line chosen at random from all of Shakespeare's works, a passage from The Bible, portions of any large volume of work, or an arbitrary sequence of characters, or the instruction might be to perform an arbitrary action such "pull on left ear with right hand." Whatever the source, the unforeseeable portion of the instructed action text is selected such that the user cannot know what they will be instructed to do ahead of time. However, the user may be permitted to indicate certain preferences such as the source from which the unforeseeable action will be drawn or a preferred language. The instruction text may include the name of the person who wishes their identity to be verifiable and the date and time at which the ceremony is performed. The instruction text may be presented via a crawl across the computer screen. The user performs the presented instruction into the computer's microphone and optionally a web camera (hearing impaired people may "sign" the instruction text into the camera), thereby creating an identity record.

The record created as a result of the initial identification ceremony is stored in step 104 on the server 206. This initial identification record includes the audio and/or visual recording of the user's performance, the initial instruction text, a time stamp, and a unique identifier for the user. Alternatively, the instruction text may be stored as a separate record. It should be noted that the user's performance may be recorded in "real time," e.g., streamed directly from the web camera/microphone to the server, or recorded "offline" by the user, using a video camera, mobile phone camera, etc., and uploaded to the server once recorded. If the offline option is taken then the system places a time limit after which the upload will not be accepted, and the user must re-start the identification ceremony with a new instruction text.

Participation in the initial identification ceremony step 100 may be predicated on identity verification depending upon how it will subsequently be used. For example, various KBA and biometric identity verification indicators such as fingerprint matching, in-person interviews and other techniques may be required before permitting the person to perform the initial identification ceremony. Such pre-verification may be more desirable for certain applications. As will be described in greater detail below, there should be reasonable certainty that the person performing the initial identification ceremony is who they claim to be if their identity will subsequently by verified by a stranger.

A secondary identification ceremony is performed in step 106 when identity verification is required to validate the authorization of a directive or transaction. The secondary identification ceremony includes a secondary instruction presented in step 108, such as instruction text which is read aloud by the user and recorded. The secondary instruction text may include unforeseeable text as described above, but different from that used in the initial identification ceremony 100 so that it is not predictable. The secondary instruction text may also include other text such as the user's name, date and time of performance of the secondary identification ceremony, and a request for some action, e.g., payment or transfer of funds between accounts. The records of the initial identification ceremony and the secondary identification ceremony are then provided to an authenticator, e.g., call center agent, for comparison in step 110. If the user performs the instruction text properly and a match is indicated based on voice, appearance or both then identity is considered verified and the transaction may be processed in step 112.

To provide some context to the embodiment described above, in the case of a credit card transaction the bank issuing the credit card could have its own server link to server 206 containing stored video records for each credit card owner. These records could be recorded in person at a branch of the bank if the bank wishes to maximize its confidence that the stored video was actually made by the owner of the card. The bank associates the credit card account number with the video sample provided by the account owner. When a person subsequently uses their credit card to make a purchase in person in a store, restaurant, gas station, or elsewhere, the card could be placed in a card reader or terminal computer device that is capable of retrieving the credit card owner's video sample record from the server and re-playing it for the vendor in order to verify the owner's identity. It is conceivable that a credit card could be manufactured that is capable of displaying the video sample itself. A similar approach could be taken with passports, identity/key cards for secure access to facilities, and other items. Note that although the two parties using the system (the credit card owner and the vendor, the passport owner and the immigration officer, the visitor and the security guard, . . . etc.) do not necessarily know each other, they can use the system as a means of increasing a first party's trust in the identity and credentials of a second party. This approach has a potential advantage over biometric techniques because there may be less user resistance to providing a video sample than fingerprints, retinal scans, DNA and other relatively invasive indicators.

Figure 3:
FIG. 3 is a screen capture of playback of an example valid identity record where instruction text scrolls across the top of the player.

If the person who wishes to be authenticated is personally known to the person performing the authentication then a replay step 114 is performed. For example, the person wishing to be authenticated could provide the person performing authentication a unique link to the server. Following that link causes the record of the initial identification ceremony to be replayed for the person performing the authentication. The instruction text used for the initial identification ceremony and information indicating when the sample was taken is also provided to the person performing the authentication. As specifically shown in FIG. 3, the instruction text and a timestamp may be part of the record of the initial authentication ceremony, e.g., scrolled across the screen as it was during the performance. Because the person who wishes to be authenticated is personally known to the person performing the authentication, matching personal knowledge and the information provided against the recording provides identity authentication without need for a secondary ceremony.

The technique described above could be used with a social networking site such as Facebook. Person A would log into their Facebook account using their username and secret password; the same username/password combination used when the ceremony was performed. When person A sends an invitation to, for example, person B, the authentication application embeds a unique icon (e.g., a decorated thumbnail picture of person A) into that invitation. When person B, who runs their own instance of the authentication application, clicks on that icon, the server plays back person A's record along with the instruction text and the time stamp.

The application then asks person B if they recognize the person in the sample as person A. If yes is indicated, the back end server is informed that person B attests to the fact that the sample really does belong to person A. Since person B knows person A in the real world, person B can easily recognize if the sample matches the individual known to them as person A. It can be trusted that the person that signed onto Facebook as person A in this instance is the same person that recorded the sample since only person A knows the password to the account. Since that must have been the same password used to create the sample, it can be trusted that person A provided the sample. Since the instance of the application is authenticated (using existing well known methods) to the back end server, it can be trusted that the sample on the server belongs to person A. Since the instance of the application running in person B's Facebook account is authenticated back to the server, person B trusts that the sample shown really comes from the genuine server. In this way, person B can trust that the person who setup the Facebook account from which the invitation originated is the person who made the sample, and thus truly is the person they know in the real world as person A. Although Facebook is used above as an example, this same embodiment could be employed in other social networking sites like Linkedin or Myspace, or to Blogs, or to online classified advertising services like Craig's List, or any other existing or future network application that requires some level of trust between online identities.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer program product, comprising a computer usable non-transitory medium having a computer readable program code embodied therein, said computer readable program code adapted to be executed to implement a method, said method comprising:
   remotely authenticating a user by:
      performing an initial identification ceremony with a first computing device by:
         selecting a first set of words that cannot be anticipated or known in advance by the user; and
         while presenting the first set of words to the user, recording a first video of the user speaking the first set of words, the first video comprising a text representation of the first set of words;
      storing the first video on a non-transitory storage medium;
      subsequently performing a secondary identification ceremony with a second computing device during a transaction by:
         selecting a second set of words that is different than the first set of words and that cannot be anticipated or known in advance by the user; and
         while presenting the second set of words to the user in order, recording a second video of the user speaking the second set of words in the presented order, the second video comprising a text representation of the second set of words;
      wherein the first video of the initial identification ceremony and the second video of the secondary identification ceremony are then provided to a third computing device;
   performing verification remotely from the user at the third computing device by verifying that the second set of words as spoken matches the text representation of the second set of words, and comparing the first video with the second video to match user voice and user appearance in the first video and the second video to determine that the user performed both the initial identification ceremony and the secondary identification ceremony; and
   authenticating the transaction.

2. The computer program product of claim 1 comprising using the first video to represent an identity of the user.

3. The computer program product of claim 2 wherein using the first video to represent the identity of the user comprises sending the first video from storage to a computing device.

4. The computer program product of claim 1 wherein presenting the first set of words to the user comprises presenting the user with a line of text to read aloud from an existing volume of work or a random sequence of characters to read aloud or text describing a specific physical motion to perform.

5. The computer program product of claim 1 comprising displaying the first video and the second video for comparison.

6. The computer program product of claim 5 comprising providing a means for registering an indication of a result of the comparison by a third party.

7. The computer program product of claim 1 comprising automated machine comparison to verify the identity of the user.

8. Apparatus for identity verification, comprising:
   a first computing device comprising an interface via which a first video of an initial identification ceremony is recorded, the first computing device interface presenting the user with a first set of words that cannot be anticipated or known in advance by the user, and recording the user speaking the first set of words while the first set of words are presented to the user, the first video comprising a text representation of the first set of words;
   a non-transitory storage medium on which the first video is stored;
   at a second computing device during a transaction performing a secondary identification ceremony, the second computing device comprising an interface via which a second video of the secondary identification ceremony is subsequently recorded, the second computing device interface presenting the user with an ordered second set of words that is different than the first set of words and that cannot be anticipated or known in advance by the user, and recording the user speaking the second set of words, in the presented order, while the second set of words are presented to the user, the second video comprising a text representation of the second set of words;
   wherein the first video of the initial identification ceremony and the second video of the secondary identification ceremony are then provided to a third computing device;
   the third computing device for performing verification remotely from the user by verifying that the second set of words as spoken matches the text representation of the second set of words, and comparing the first video with the second video to match user voice and user appearance to determine that the user performed both the initial identification ceremony and the secondary identification ceremony; and authenticating the transaction.

9. The apparatus of claim 8 wherein the third computing device comprises an interface via which the first video is presented to identify the user.

10. The apparatus of claim 9 comprising storage media having stored thereon sets words created prior to performing the initial identification ceremony.

11. The apparatus of claim 8 wherein the first computing device presents the user with the first set of words by presenting the user with a line of text to read aloud from an existing volume of work or a random sequence of characters to read aloud or text describing a specific physical motion to perform.

12. The apparatus of claim 8 wherein a server manages storage of the first video and provides the first video to the third computing device.

13. The apparatus of claim 8 wherein the third computing device displays the first video and the second video for comparison.

14. The apparatus of claim 8 wherein the third computing device comprises an interface for registering an indication of a result of the comparison by a third party.

15. The apparatus of claim 8 comprising automated machine comparison of the first video and the second video to verify an identity of the user.

16. The apparatus of claim 8 wherein performance of the initial and secondary identification ceremonies do not require the user to provide secret personal information.

* * * * *